June 2, 1953 — G. L. COTTER — 2,640,733
FLUID PRESSURE BRAKE APPARATUS
Filed March 30, 1950
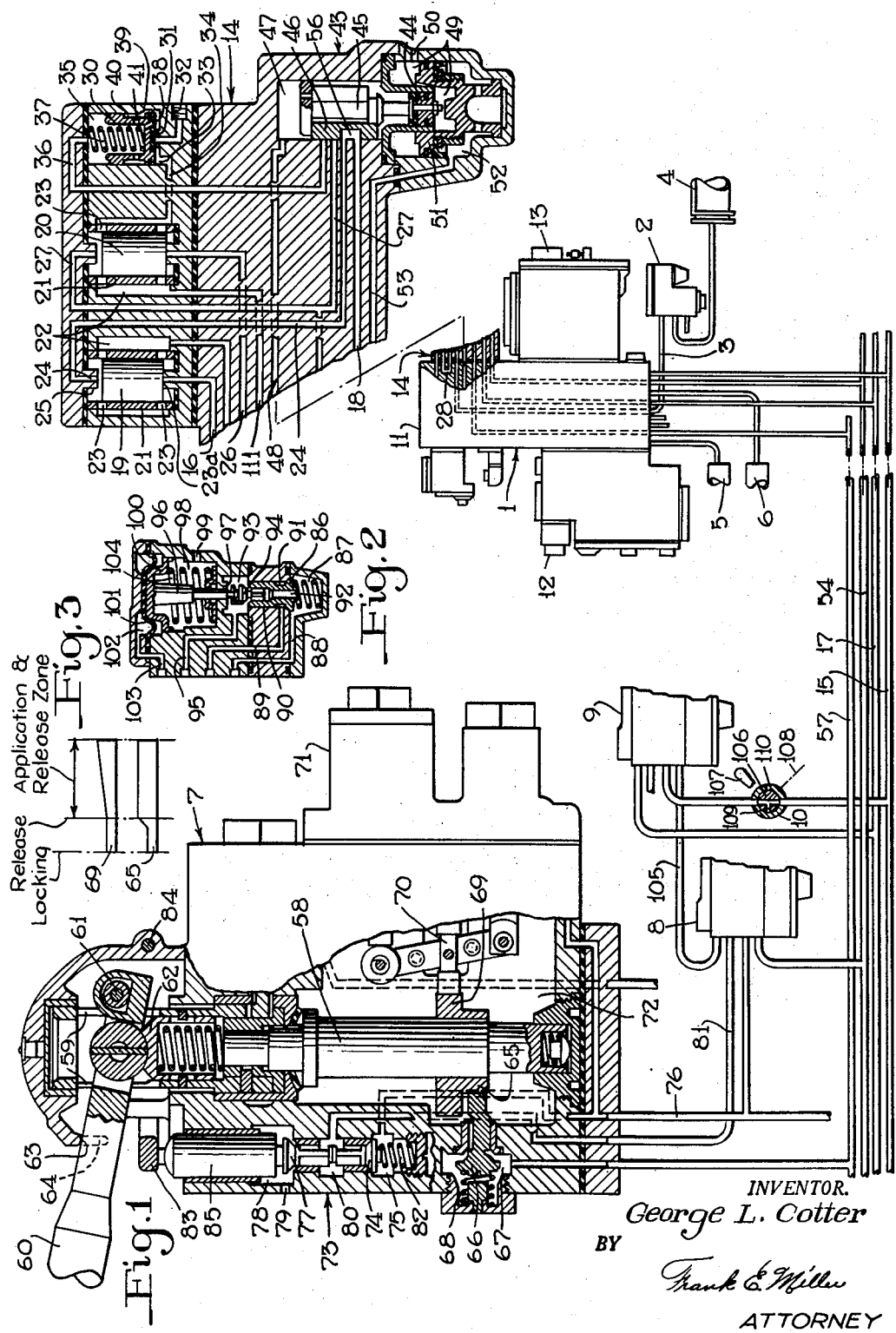
INVENTOR.
George L. Cotter
BY Frank E. Miller
ATTORNEY Patented June 2, 1953

2,640,733

UNITED STATES PATENT OFFICE 2,640,733

FLUID PRESSURE BRAKE APPARATUS

George L. Cotter, Pittsburgh, Pa., assignor to Westinghouse Air Brake Company, a corporation of Pennsylvania Application March 30, 1950, Serial No. 152,944

5 Claims. (Cl. 303—26)

This invention relates to fluid pressure brake apparatus and more particularly to the type for use on railway vehicles.

In U. S. Patent 2,173,940, issued on September 26, 1939, to E. E. Hewitt et al. there is disclosed a locomotive brake equipment embodying an engineer's automatic brake valve device for controlling the brakes on the locomotive and cars of a train either on the electro-pneumatic straight air principal through the medium of a straight air pipe, or on the automatic principal through the medium of a brake pipe and a brake controlling valve device on the locomotive and each car of a train. An engineer's independent brake valve device is provided for controlling the brakes on the locomotive independently of those on the cars and for also, through the medium of an interlock valve device associated with the brake controlling valve device on the locomotive, effecting a release of a brake application on the locomotive caused either from the straight air pipe or the brake pipe.

The interlock valve device comprises two double check valves for selectively closing the automatic, straight air and independent brake control communication to a fluid pressure relay valve device which is operative to regulate the brake applying pressure of fluid in the usual locomotive brake cylinder device according to the controlling pressure in the effective one of said communications. The interlock valve device further comprises an independent release valve device for releasing to atmosphere fluid under pressure from the fluid pressure relay valve device to release an application of locomotive brakes or to prevent an application thereof, and a selector valve device controlled by and cooperative with the engineer's independent brake valve device for controlling said release valve device.

The release valve device is in the form of a valve piston arranged to cooperate with an annular seat on one side for controlling the fluid pressure release communication from the fluid pressure relay valve device to atmosphere. When the release valve piston is seated the area of the seated side around the seat is open to the fluid pressure relay valve device while that within said seat is open to atmosphere. When unseated the full area of the one side of the release valve piston is subject to pressure of fluid from the fluid pressure relay valve device. At the opposite side of the release valve piston is a control chamber containing a spring for urging the valve to its seat. A small charging port through the release valve piston constantly connects the control chamber at the one side to the opposite side outside of the annular seat. While not disclosed in the above mentioned patent, the commercial structure is also provided with another charging communication for the control chamber in the form of a plurality of by-pass grooves for connecting said chamber to the outside of the annular seat at the opposite side of the valve piston when the valve piston is seated. This other communication through the by-pass grooves is however closed immediately upon movement of the release valve piston from its seat.

The selector valve device is controlled through an actuating pipe from the independent brake valve device for controlling communication between the control chamber at the one side of the release valve piston and an application and release pipe extending from end to end of the locomotive for connection with a corresponding pipe on a connected locomotive or locomotive unit when coupled therewith. The application and release pipe is also connected to the independent brake valve device on the respective locomotive.

The independent brake valve device comprises a handle having two planes of movement. In an elevated plane fluid under pressure is released from the actuating pipe to effect movement of the selector valve device to a normal position for closing communication between the control chamber at the one side of the release valve piston and the application and release pipe to permit prompt equalization of fluid pressures at opposite sides of said piston to hold it seated while the automatic brake valve device is operated to effect either an automatic or an electro-pneumatic straight air application of brakes, so that the locomotive brakes will operate in harmony with those on a connected train. Also in this plane of movement the locomotive brakes may, if desired, be applied and released independently of the train brakes when the train brakes are released.

In the depressed plane of movement of the independent brake valve handle fluid under pressure is supplied to the actuating pipe to effect operation of the selector valve device to a release position for connecting the control chamber at the one side of the release valve piston to the application and release pipe, and in this plane of movement the handle has a release position for opening said pipe to atmosphere and a locking position for closing communication between said pipe and atmosphere. The release position, in which the application and release pipe and control chamber at the one side of the release valve piston are open to atmosphere, is provided for releasing from said control chamber fluid under pressure supplied thereto from the opposite side of the release valve piston through the charging port and/or by-pass grooves, after an application of brakes has been effected, or during the time fluid under pressure is being supplied to the fluid pressure relay valve device, to cause opening of said release valve piston for releasing fluid under pressure from the fluid pressure relay valve device for in turn releasing, independently of the train brakes, a brake application already effected on the locomotive, or for preventing an application of the locomotive brakes while the train brakes are being applied.

The locking position of the independent brake valve handle is provided for preventing a straight air application of the locomotive brakes, but not an automatic application, upon operation of the automatic brake valve device to apply the brakes on the train. To accomplish this the selector valve when it operates in response to depression of the independent brake valve handle intercepts the straight air control communication through which a straight air application of brakes on the locomotive is effected, while the control chamber at the one side of the release valve piston is merely open to the application and release pipe which is closed at the independent brake valve device, so that in case of an automatic application, fluid under pressure supplied to operate the fluid pressure relay valve device will equalize into said chamber and pipe and hold the release valve piston seated to permit the locomotive brakes to be applied.

It has been found that under certain circumstances, such as leakage from the application and release pipe as at the couplings between locomotive units, that upon an emergency reduction in brake pipe pressure an emergency application of brakes will not be obtained on the locomotive when the independent brake valve device is in locking position due to the fact that pressure of fluid will not build up in the control chamber at the one side of the release valve piston and the connected application and release pipe fast enough through the small charging port and by-pass grooves to hold said valve piston closed against the rapid emergency build-up of pressure on the opposite seat side of said valve piston, as a result of which, said valve piston will become unseated and vent to atmosphere the fluid pressure intended to cause an application of the locomotive brakes. Some fluid under pressure will of course be obtained in the control chamber and application and release pipe so that the release valve piston will close before complete loss of the brake applying fluid, but from a practical standpoint substantially no application of brakes will be obtained. This is undesirable, and the principal object of the invention is therefore the provision of means for obviating this difficulty.

Other objects and advantages will become apparent from the following more detailed description of the invention.

In the accompanying drawing; Fig. 1 is a diagrammatic view of a locomotive brake equipment embodying the invention; Fig. 2 is a diagrammatic view of a relay valve device two of which are shown in outline in Fig. 1; and Fig. 3 is a development view of two cams embodied in a brake valve device shown in Fig. 1.

*Description*

As shown in the drawing, the locomotive brake equipment comprises a brake controlling valve device 1, a fluid pressure relay valve device 2 arranged to be controlled by pressure of fluid in a control pipe 3 for providing fluid at a corresponding pressure in a brake cylinder device 4, an auxiliary reservoir 5, an emergency reservoir 6, and an engineer's independent brake valve device 7, all of which structures may be identical in structure and operation to corresponding parts fully disclosed in the Hewitt et al. patent above referred to. According to the invention I associated with the locomotive brake equipment, just described, two fluid pressure controlled valve devices 8 and 9 and a manually operative valve device 10.

The brake controlling valve device 1 comprises a pipe bracket 11 upon one face of which is mounted a service application valve device 12 while on another face is mounted an emergency valve device 13 and an interlock valve device 14. 15 designates a brake pipe adapted to extend from end to end of the locomotive for connection with the brake pipe on cars of a train and the pressure in which is arranged to be controlled by operation of an engineer's automatic brake valve device not shown in the present application.

The service application valve device 12 is adapted to operate in the usual manner upon a service reduction in pressure in brake pipe 15 for supplying fluid under pressure from the auxiliary 5 to an application passage 16 in the interlock valve device 14 for effecting a service application of brakes in a manner which will be more fully explained. Upon an emergency reduction in pressure in the brake pipe 15 the service application valve device 12 and emergency application valve device 13 are both adapted to operate, in the usual manner, to supply fluid under pressure from the auxiliary and emergency reservoirs 5, 6 to the application passage 16 for effecting an emergency application of brakes. Upon recharging of brake pipe 15 to normal pressure, following either a service or an emergency application of brakes, the service application valve device 12 and emergency application valve device 13 are adapted to return to normal position in which the application passage 16 will be vented to atmosphere.

The reference numeral 17 designates a straight air pipe adapted to extend from end to end of the locomotive for connection with a corresponding pipe on connected cars of a train, as well as with the engineer's automatic brake valve device (not shown) on the locomotive. The straight air pipe 17 is connected to a straight air application and release passage 18 in the interlock valve device 14 and the locomotive brakes are adapted to be applied and released in accordance with variations in pressure in said pipe, in a manner to be later described.

The interlock valve device 14 comprises two like double check valves 19 and 20 each slidably mounted in a bushing 21 secured in the casing. The double check valves 19 and 20 may be like those disclosed in U. S. Patent 2,311,851, issued on February 23, 1943, to G. T. McClure, but for the purpose of illustration are shown in the form of solid cylinders. Encircling each bushing is an annular cavity 22 which is open to the interior of the bushing through radial ports 23 in the bushing provided adjacent its opposite ends.

The double check valve 19 is arranged to control communication between the respective annular cavity 22 and the automatic application passage 16 opening through a seat 23a to one end thereof and a passage 24 opening through a seat 25 to its opposite end. When fluid under pressure is supplied to passage 16 such pressure acting on the check valve 19 is adapted to shift said check valve to the position in contact with seat 25 to close communication between the annular cavity 22 and passage 24 and for opening said cavity to passage 16 through the ports 23 at the lower end of the respective bushing 21. When fluid under pressure is supplied to passage 24 such pressure is adapted to shift the check valve 19 into contact with seat 23a to close communication between the respective annular cavity 22 and the automatic passage 16 and for opening said annular cavity to the passage 24. The double check valve 20 operates in a like manner to control communication between the respective annular cavity 22 and passages 26 and 27, passage 26 being permanently connected via a passage 28 in the bracket 11 to the annular cavity 22 encircling the double check valve 19.

The interlock valve device further comprises an independent release valve in the form of a valve piston 30, slidably mounted in the casing with one face arranged to cooperate with an annular valve seat 31 for controlling communication between an atmospheric passage 32 open to the interior of said seat and an annular space 33 encircling said seat, said space being open by way of a passage 34 to the annular cavity 22 encircling the double check valve 20. At the opposite side of the valve piston 30 is a chamber 35 open to a passage 36 and containing a spring 37 acting on said valve piston for urging it against the seat 31. A port 38 through the valve piston provides a constantly open communication between chamber 35 and space 33 while one or more grooves 39 opens said space to an annular cavity 40, provided in the exterior surface of said valve piston, when the valve piston is in contact with the seat 31. Immediately upon movement of the valve piston 30 out of contact with seat 31 said piston is adapted to close communication between groove 39 and annular cavity 40. The cavity 40 is in contant communication with chamber 35 through one or more ports 41.

The interlock valve device further comprises a selector valve device 43 comprising a piston 44 connected through the medium of a stem 45 to a slide valve 46 which is movable with said piston. The slide valve 46 is contained in a valve chamber 47 formed at one side of piston 44 and which is adapted to be constantly supplied with fluid under pressure from the main reservoir (not shown) on the locomotive by way of a passage 48. At the opposite side of piston 44 is a chamber 49 which is open to atmosphere through a passage 50. Below the piston 44 there is slidably mounted in the casing a coaxially arranged piston 51 of greater diameter than piston 44. One face of piston 51 is exposed to atmospheric pressure in chamber 49 while at the opposite side is a chamber 52 open through a passage 53 in the brake controlling valve device 1 to an actuating or independent release pipe 54. When chamber 52 is void of fluid under pressure the pressure of fluid in valve chamber 47 acting on the one face of piston 44 is adapted to move said piston and the slide valve 46 to a normal position in which they are shown in the drawing. When fluid under pressure is supplied to piston chamber 52, in a manner which will be later described, said piston is adapted to move into contact with piston 44 and then shift the latter piston and the slide valve 46 to an independent release position, which will be later described.

The passages 18, 24, 27 and 36 all lead to the seat of the selector slide valve 46 which has a cavity 56 adapted in the normal position of said slide valve to establish communication between passages 18 and 24 and in the release position of said slide valve to establish communication between passages 27 and 36. In the normal position of slide valve 46 the passages 27 and 36 are lapped by said valve while in the release position the passages 18 and 24 are lapped by said valve.

The engineer's independent brake valve device 7 comprises a casing in which is journaled a shaft 58 through the upper end of which there are provided oppositely arranged slots 59 in which are disposed one end of an operating handle 60. The handle 60 is pivoted on a pin 61 carried by the shaft 59 for vertical movement relative to said shaft from a normal position in which it is shown in the drawing to a depressed position which will be later described. A spring pressed plunger 62 slidably mounted in shaft 58 acts on the handle 60 for normally urging it to its elevated position, defined by engagement with a surface 63 on the casing. From this elevated position the handle 60 is movable in a horizontal plane from a release position through an application and release zone (Fig. 3). Upon depression of handle 60 it is movable in the opposite direction to a locking position under a depending lip 64 on the casing which is adapted to hold said handle in its depressed position upon release of manual pressure on said handle. The shaft 58 carries a cam 65 for controlling a cut-off valve 66 which is contained in a chamber 67 open to the application and release pipe 57. In all positions of the brake valve handle 60 except the locking position, cam 65 is adapted to hold the valve 66 open but in the locking position said cam is relieved (Fig. 3) to permit closing of said valve by a spring 68. The shaft 58 also carries a second cam 69 for, through the medium of a plunger 70, operating a self-lapping valve device 71 to vary pressure of fluid in a chamber 72 from atmospheric pressure in the release position in proportion to the extent of movement of said handle from said position into said application and release zone, whereby with the cut-off valve 66 open the pressure of fluid in the application and release pipe 57 will be likewise varied. In the release position and locking position of handle 60 the self-lapping valve device 61 will open chamber 72 to atmosphere.

The independent brake valve device further comprises a release valve device 73 including a fluid pressure supply valve 74 contained in a chamber 75, adapted to be constantly supplied with fluid under pressure from a main reservoir pipe 76, and an opposite and coaxially arranged release valve 77 contained in a chamber 78 which is open to atmosphere through a port 79. The two valves 74 and 77 have fluted stems engaging each other in a chamber 80 which is open to a pipe 81 and whereby the valves are movable in unison. With the brake valve handle 60 in its normal elevated position a spring 82 acting on the valve 74 is adapted to close said valve and to open valve 77 for thereby cutting off supply of fluid under pressure to pipe 81 and for venting said pipe to atmosphere through port 79. A bail 83 fulcrumed on a pin 84 is disposed under the handle 60 and engages a plunger 85 connecting said bail to the valve 77. Upon depression of handle 60 it is adapted to engage the bail 83 and operate the plunger 85 for closing the valve 77 and opening the valve 74 for thereby disconnecting pipe 81 from atmosphere by way of port 79 and for supplying fluid under pressure from the supply valve chamber 75 to said pipe. The bail may thus be operated to supply fluid under pressure to pipe 81 in all positions of the brake valve handle 60 in its horizontal plane of movement and in the locking position will maintain the valve 74 open for maintaining such supply.

Heretofore, that is, in the brake equipment disclosed in the Hewitt et al. patent above referred to, the pipe 81 was connected directly to the independent release pipe 54, but, according to the invention, such connection is controlled by the valve device 8 in turn controlled by the valve device 9 and the manually operable valve device 10.

The two valve devices 8 and 9 are identical in construction each comprising (Fig. 2) a poppet valve 86 contained in a chamber 87 for controlling communication between two passages 88 and 89. The valve 86 is provided on one end of a stem 90 which is slidably mounted in the casing of the device and adjacent the valve said stem is provided with an annular cavity 91 which is constantly open to passage 89. The stem 90 and valve 86 are provided with an axial passage 92 open at one end to chamber 87 and opening at the opposite end through a valve seat to a chamber 93 containing a valve 94 arranged to cooperate with said seat for controlling communication between chamber 87 and chamber 93, the latter chamber being open to a passage 95. The valve 94 is connected to one end of a stem 96 for movement with said stem. The stem 96 slidably extends through a bore in a partition wall 97 separating chamber 93 from a chamber 98 which is in constant communication with atmosphere through a port 99. In chamber 98 the stem 96 is provided with a follower 100 engaging one side of a flexible diaphragm 101 which is clamped around its periphery in the casing. At the opposite side of diaphragm 101 is a control chamber 102 which is open to a passage 103 in the casing. A spring 104 in chamber 98 acts through the follower 100 on diaphragm 101 with a chosen degree of force.

In the valve device 8 passage 88 is connected to the independent release pipe 54, passage 89 is connected to the main reservoir pipe 76, passage 95 is connected to pipe 81 from the independent brake valve device 7, and passage 103 is connected to a pipe 105 leading to passage 88 and thereby valve chamber 87 in the valve device 9. In the valve device 9 passage 103 is connected to the straight air pipe 17, passage 95 is open to atmosphere and passage 89 is connected to the manually operable valve device 10.

The manually operable valve device 10 comprises a casing containing a rotary plug valve 106 to which a handle 107 is connected for turning said valve to either a normal position in which it is shown in the drawing or to a second position in which said handle will occupy the position designated by the dash line 108. The plug valve 106 has a T-shaped port 109 extending therethrough adapted in the normal position of handle 107 to establish communication between passage 89 in the valve device 9 and the brake pipe 15 which communication is adapted to be closed by said valve upon movement of the handle 107 to the position indicated by the line 108 and in which latter position the port 109 registers with a passage 110 in the casing for opening the passage 89 in the valve device 9 to atmosphere.

Operation

In operation, let it be assumed that the brake pipe 15 is charged with fluid under pressure as a result of which the brake controlling valve device 11 will be in its brake release position venting passage 16. Let it further be assumed that the straight air pipe 17 is void of fluid under pressure and that the independent brake valve handle 60 is in release position venting the application and release pipe 57 and that the brakes on the locomotive are released.

With the straight air pipe 17 vented the valve device 9 will assume the position in which its parts are shown in Fig. 2 of the drawing for connecting pipe 105 to its vented passage 95 whereby the parts of the valve device 8 will also be in a like position connecting the pipe 81 to the independent release pipe 54.

Let it further be assumed that plug valve 106 and handle 107 are in the position indicated by the dashline 108 whereby when the valve device 9 is operated by fluid under pressure supplied to the straight air pipe 17 for effecting an application of brakes, the operation of said valve device by such pressure will maintain pipe 105 open to atmosphere past valve 86 in the valve device 9, so that communication will be maintained between pipes 81 and 54 at all times as has been the practice prior to the present invention.

Now let it be assumed that by operation of the usual engineer's automatic brake valve device a reduction in pressure is effected in the brake pipe 15. The brake controlling valve device 1 will respond to such reduction to supply fluid only from the auxiliary reservoir 5, in case the reduction is at a service rate, or from both said reservoir and emergency reservoir 6 in case of an emergency reduction, to the passage 16. Fluid thus supplied to the passage 16 will flow to the lower end of the double check valve 19 and shift said valve to its upper position and then flow to passage 28 and thence through passage 26 to the lower end of the double check valve 20 and shift it to its upper position. Fluid from passage 26 will then flow to passage 111 and thence through pipe 3 to the relay valve device 2 for actuating same to supply fluid at a corresponding pressure to the brake cylinder device 4 for applying the brakes on the locomotive. Upon restoring the pressure of fluid in brake pipe 15, fluid will be released from the relay valve device 2, by reverse flow, through the brake controlling valve device 1 for thereby causing a release of fluid under pressure from the brake cylinder device 4 and a release of the locomotive brakes.

Now let it be assumed that by operation of the engineer's automatic brake valve device fluid under pressure is supplied to the straight air pipe 17 for effecting a straight air application of brakes on the locomotive. Fluid thus supplied to pipe 17 will flow through passage 18 in the brake controlling valve device 1 to the interlock valve device 14 and thence through cavity 56 in the selector slide valve 46 to passage 24 leading to the upper end of the double check valve 19. Such pressure will move the double check valve 19 to its lower position and then flow through passage 26 to the lower end of the double check valve 20 shifting it to its upper position and then flow to passage 111 and pipe 3 to the relay valve device 2 for actuating said device to supply fluid at a corresponding pressure to the brake cylinder device 4 for applying the locomotive brakes. Upon release of fluid under pressure from the straight air pipe 17, fluid will be released from the relay valve device 2 and thereby from the brake cylinder device 4 for releasing the brakes on the locomotive.

It is to be understood that in effecting a straight air application and release of brakes on the locomotive, as just described, that the parts of the selector valve device 43 will be in their lower position, in which they are shown in the drawing, incident to chamber 52 being at atmospheric pressure through the independent release pipe 54, the valve device 8, pipe 81 and past the open valve 77 in the release valve device 73 of the independent brake valve device, it being assumed that during the operation above described the handle 60 of the said brake valve device is in its elevated, release position in which it is shown in the drawing.

When the locomotive brakes are applied either in response to a reduction in pressure in brake pipe 15 or to supply of fluid under pressure to the straight air pipe 17 as above described, the fluid under pressure supplied past the double check valve 20 to the relay valve device 2 also becomes effective through passage 34 in space 33 at one side of the release valve piston 30 and from said space flows through port 38 and by-pass groove 39 into chamber 35 and passage 36, which is lapped by the selector slide valve 46, at such a rate that the increase in pressure in said chamber with respect to that in said space enables spring 37 to hold said release valve piston seated in order that the brakes on the locomotive may be applied.

After the brakes on the locomotive are applied in response to a reduction of pressure in the brake pipe 15, as above described, if the engineer desires to release such application independent of pressure of fluid in the brake pipe and hence without causing a release of brakes on the connected cars of a train he will merely depress his independent brake valve handle 60 in its release position for operating the release valve device 73 to supply fluid under pressure to pipe 81 from which it will flow through the valve device 8 to the independent release pipe 54 and thence to piston chamber 52 in the selector valve device 43. The selector valve piston 51 will thereby be operated to move the piston 44 and slide valve 46 to their upper position for connecting passage 36 and chamber 35 above the release valve piston 30 to passage 27 and thence to the application and release pipe 57 which is vented to atmosphere past the open cut-off valve 66 and through the self-lapping valve device 71 of the independent brake valve device 7. Fluid under pressure will thereby be released from chamber 35 at a rate so exceeding the rate of supply through the port 38 and by-pass groove 39 in valve piston 30 as to enable the pressure of fluid in space 33 to shift said valve piston against spring 37 out of contact with its seat 31 for thereby opening passage 34 to the atmospheric port 32, whereupon fluid under pressure will be released from the relay valve device 2 and thereby from the brake cylinder device 4 for effecting a release of brakes on the locomotive. If the automatic application of brakes thus being released is due to a service reduction in pressure in brake pipe 15, in which case the service application valve device 12 will be in the usual lap position, only the fluid acting in the relay valve device 2 need be released to obtain a release of locomotive brakes, but in case the application is due to an emergency reduction in pressure in brake pipe 15, under which condition the auxiliary and emergency reservoirs 5 and 6, respectively, will be open to the relay pipe 3 fluid under pressure will have to be released from said reservoirs as well as from said relay valve device in order to obtain a release of the locomotive brakes. In either case it is to be noted that a release of the locomotive brakes may be obtained independently of the brake pipe merely by depressing the brake valve handle 60 which may be relieved of manual pressure upon completion of such release without the locomotive brakes becoming reapplied.

If after the brakes on the locomotive have been released by depressing of the independent brake valve handle 60 it is desired to reapply them, the engineer may permit the handle 60 to return to its elevated position and will then move said handle into the application and release zone. The parts of the selector valve device 43 will thereby be returned to their lower normal position and the self-lapping valve device 71 will be operated to supply fluid under pressure to the application and release pipe 57 thence to passage 27 and the upper end of the double check valve 20. Such fluid will move the double check valve 20 to its lower position and then flow through passage 111 to the relay valve device 2 for operating same to supply fluid under pressure to the brake cylinder device 4 for reapplying the brakes to a pressure corresponding to the position of the independent brake valve handle in the application and release zone, the independent release valve piston 30 remaining seated at this time due to equalization of fluid pressure from space 33 into chamber 35 and passage 36, as before described. It is desired to point out that the locomotive brakes may be thus reapplied even if the handle 60 is moved into its application and release zone while still depressed, since with the parts of the selector valve device 43 in their upper position the fluid supplied to the application release pipe 57 and thence to passage 27 will merely flow through cavity 56 in the selector slide valve 46 to chamber 35 at the spring side of a release valve piston 30 for holding it seated.

Now let it be assumed that the brakes on the locomotive are applied by fluid under pressure from the straight air pipe 17 and that it is desired to release such application independent of pressure of fluid in said pipe and hence without releasing brakes on cars of a connected train. To accomplish such release the independent brake valve device will be operated in the same manner as to independently release an application of brakes effected in response to a reduction of pressure in the brake pipe 15. However in order to prevent the locomotive brakes from being reapplied by pressure of fluid in the straight air pipe after such release and which would occur if the handle 60 were allowed to return to its elevated position, said handle must be moved to locking position for maintaining fluid under pressure in piston chamber 52 of the selector valve device 43 so that the slide valve 46 thereof will stay in its upper position closing communication between passage 18, which at this time is charged with fluid under pressure from the straight air pipe 17, and passage 24.

When a straight air application of brakes is effected by supply of fluid under pressure to the straight air pipe 17, as above described, such fluid will become effective in diaphragm chamber 102 of the valve device 9 and actuate the diaphragm 101 therein to close the connected valve 94 and open the respective valve 86, which will thereby connect pipe 105 to the manually operable valve device 10. With handle 107 of the manually operable valve device 10 in the position indicated by the dash line 108 pipe 105 will thus be merely reconnected to atmosphere through the valve device 9 whereby the parts of the valve device 8 will remain in their upper position connecting pipe 81 to the independent release pipe 54 which permits the independent release of a straight air application of brakes on the locomotive as above described.

In summary, it will now be seen that after effecting an independent release of brakes on the locomotive effected in response to a reduction in pressure in brake pipe 15, the independent brake valve handle 60 may be allowed to return to its elevated position without causing a reapplication of locomotive brakes, but in contrast, when the independent brake valve device is operated to effect a release of brakes on the locomotive effected in response to supply of fluid under pressure to the straight air pipe 17 the brake valve handle 60 must be moved to its locking position for maintaining the parts of the selector valve device 43 in their upper position in order to prevent a reapplication of the locomotive brakes by fluid under pressure from the straight air pipe. It will also be noted that in this upper position of slide valve 46 of the selector valve device 43 passage 36 from chamber 35 at one side of the release valve piston is connected to passage 27 and thence to the application and release pipe 57 the volume of which, and especially in case of leakage therefrom, may prevent an application of the locomotive brakes in response to an emergency reduction in pressure in the brake pipe 15, as will now be described.

With the handle 60 of the independent brake valve device in locking position closing the connected end of the application and release pipe 57 and with the selector slide valve 46 in its upper position connecting passages 36 and 27, let it be assumed that an emergency reduction in pressure is effected in the brake pipe 15 due to which fluid under pressure will be supplied by the brake controlling valve device 1 past the double check valves 19 and 20 to passage 111 leading to the relay valve device 2, and at the same time to passage 34 and thence to space 33 below the release valve piston 30. Under such a condition the pressure of fluid may increase in the space 33 below the release valve piston 30 so fast with respect to the capacity of port 38 through said piston and the by-pass grooves 39 connecting opposite sides of said piston to supply fluid to chamber 35 and thence through passage 36 to the application and release pipe 57 that the pressure in space 33 will increase so much over that in chamber 35 as to move said piston against spring 37 and open said space to the atmospheric port 32 whereby fluid under pressure will be released from passage 34 to atmosphere instead of becoming effective in the relay valve device 2 to effect operation thereof to apply the brakes. It is to be noted that initial movement of the release valve piston 30 away from its seat 31 closes the by-pass groove 39 so that supply of fluid under pressure to chamber 35 is then limited solely to the capacity of port 38 and the overall result is that before sufficient pressure of fluid can be obtained in chamber 35, passage 36 and the application and release pipe 57 to coact with spring 37 to move the valve piston 30 back into engagement with seat 31, the pressure of fluid in passage 34 and thereby in the relay valve device 2 will become so reduced that any application of brakes resulting therefrom will be of negligible degree, it being apparent that the valve piston 30 will be moved back into contact with its seat 31 when the pressure of fluid in space 33 becomes so reduced as to be overcome by the opposing force of spring 37 and whatever pressure may have accumulated in the chamber 35.

Thus with the independent brake valve handle 60 in its locking position and the selector valve device 43 in its upper position an automatic emergency application of brakes on the locomotive may be substantially prevented under certain circumstances and this is undesirable.

In order to insure that an emergency application of brakes will be obtained on the locomotive following release of a straight air application of brakes, such release of a straight air application of brakes may be effected by moving handle 107 of the manually operable valve device 10 to the position in which it is shown in the drawing instead of depressing the independent brake valve handle 60 as above described. With handle 107 of the plug valve 106 thus positioned the brake pipe 15 will be connected to the annular chamber 91 in the valve device 9 and with said device operated by pressure of fluid from the straight air pipe 17 acting in chamber 102 thereof, said chamber 91 will be open to pipe 105 leading to chamber 102 in the valve device 8. The valve device 8 will thereby be operated by fluid under pressure from the brake pipe 15 to connect the main reservoir pipe 76 to the independent release pipe 54 whereby fluid under pressure from said reservoir will move the parts of the selector valve device 43 to their independent release position in which an independent release of a straight air application of brakes on the locomotive will occur by way of the application and release pipe 57 and the independent brake valve device 7 with the handle 60 in its elevated, release position, the same as if said handle were depressed. Moreover, as long as the brake pipe 15 remains charged with fluid under pressure and the handle 107 of the manually operated valve device 10 remains in the position in which it is shown in the drawing, the parts of the valve device 8 will remain in the position to hold the selector slide valve 46 in its upper position to prevent further application of brakes on the locomotive by fluid under presure from the straight air pipe 17.

However upon an emergency reduction in pressure in brake pipe 15 for effecting an emergency application of brakes, chamber 102 in valve device 8 being open to the brake pipe 15, the fluid under pressure will be vented from said chamber and the parts of the valve device 8 will return to their upper position for reconnecting the independent release pipe 54 to pipe 81 which will be vented through the release valve device 73 in the independent brake valve device 7 with the handle 60 thereof in its elevated release position. The parts of the selector valve device 43 will therefore promptly return to their lower position upon the emergency reduction in brake pipe pressure for disconnecting passage 36 from passage 27 whereby the fluid under pressure supplied through and around the release valve piston 30 to chamber 35 merely has to equalize into said chamber and passage 36 and this will hold the valve piston 30 seated to insure the fluid pressure supplied to passage 111 by operation of the brake controlling valve device 1 becoming effective in the relay valve device 2 for applying the brakes on the locomotive.

If after an emergency application of brakes on the locomotive has been effected as just described the engineer desires to release such application he may accomplish this by depressing the brake valve handle 60 which will supply fluid under pressure to piston chamber 52 in the selector valve device 43, since the pipes 81 and 54 are reconnected by the valve device 8 upon the emergency reduction in brake pipe pressure, and the release of brakes will occur in the same manner as before described.

It is to be noted that the brake equipment will operate in the same manner as heretofore except for releasing an application of brakes effected by fluid under pressure from the straight air pipe 17, such release being accomplished by operating the manually operable valve device 10 instead of depressing the independent brake valve handle 20, and that a straight air reapplication of locomotive brakes will be prevented without moving said brake valve handle to its locking position. If handle 107 of the valve device 10 is allowed to remain in the position in which it is shown in the drawing, an application of brakes by fluid under pressure supplied to the straight air pipe 17 will be prevented the same as if handle 60 of the independent brake valve device were allowed to remain in locking position. It will thus be seen that by using the valve devices 8, 9 and the manually operable valve device 10 the same results may be obtained as using the locking position of the independent brake valve handle 60 with the additional desirable result of insuring an emergency application of brakes on the locomotive in response to an emergency reduction in pressure in the brake pipe when the selector valve device 43 is conditioned for preventing a reapplication of a straight air application of brakes on the locomotive.

*Summary*

It will now be seen that by the use of the invention, the locomotive brake equipment will operate to accomplish the same results as heretofore with the additional desirable result of insuring an emergency application of brakes in response to an emergency reduction in pressure in the brake pipe under the condition where an emergency application might not occur heretofore.

Having now described my invention, what I claim as new and desire to secure by Letters Patent, is:

1. In a fluid pressure brake equipment, in combination, fluid pressure operable brake applying means, a brake pipe, brake controlling means operative upon a reduction in pressure in said brake pipe to supply fluid under pressure to said brake applying means, a straight air pipe for conveying fluid under pressure to said brake applying means, valve means having one position for closing a vent from said brake applying means and establishing a communication between said straight air pipe and brake applying means and having a second position for opening said vent and closing said communication, an engineer's brake valve device for selectively positioning said valve means, and means responsive to an emergency reduction in pressure in said brake pipe to effect movement of said valve means to said second position.

2. In a fluid pressure brake equipment, in combination, fluid pressure operable brake applying means, a brake pipe, brake controlling means operative upon a reduction in pressure in said brake pipe to supply fluid under pressure to said brake applying means, a straight air pipe for conveying fluid under pressure to said brake applying means, selector means responsive to release of fluid under pressure from a chamber to open a communication between said straight air pipe and said brake applying means and to close a fluid pressure release communication from said brake applying means and responsive to supply of fluid under pressure to said chamber to close the first named communication and open the second named communication, an engineer's independent brake valve device for selectively supplying and releasing fluid under pressure to and from said chamber, and valve means controlling communication between said brake valve device and chamber operative to open such communication in response to release of fluid under pressure from both said straight air pipe and brake pipe and to close such communication and supply fluid under pressure to said chamber in response to pressure of fluid in said straight air pipe.

3. In a fluid pressure brake equipment, in combination, fluid pressure operable brake applying means, a brake pipe, brake controlling means operative upon a reduction in pressure in said brake pipe to supply fluid under pressure to said brake applying means, a straight air pipe for conveying fluid under pressure to said brake applying means, selector means responsive to release of fluid under pressure from a chamber to open a communication between said straight air pipe and said brake applying means and to close a fluid pressure release communication from said brake applying means and responsive to supply of fluid under pressure to said chamber to close the first named communication and open the second named communication, an engineer's independent brake valve device for selectively supplying and releasing fluid under pressure to and from said chamber, a fluid pressure supply pipe, a valve device controlling communication between said brake valve device and said chamber and operative upon release of fluid under pressure from a second chamber to open such communication and upon supply of fluid under pressure to said second chamber to open the first named chamber to said fluid pressure supply pipe, and valve means controlled by pressure of fluid in said straight air pipe operative upon supply of fluid under pressure thereto to open said second chamber to said brake pipe and upon release of fluid under pressure from said straight air pipe to open said second chamber to atmosphere.

4. In a fluid pressure brake equipment, in combination, fluid pressure operable brake applying means, a brake pipe, brake controlling means operative upon a reduction in pressure in said brake pipe to supply fluid under pressure to said brake applying means, a straight air pipe for conveying fluid under pressure to said brake applying means, selector means responsive to release of fluid under pressure from a chamber to open a communication between said straight air pipe and said brake applying means and to close a fluid pressure release communication from said brake applying means and responsive to supply of fluid under pressure to said chamber to close the first named communcation and open the second named communication, an engineer's independent brake valve device for selectively supplying and releasing fluid under pressure to and from said chamber, a fluid pressure supply pipe, a valve device controlling communication between said brake valve device and said chamber and operative upon release of fluid under pressure from a second chamber to open such communication and upon supply of fluid under pressure to said second chamber to open the first named chamber to said fluid pressure supply pipe, valve means controlled by pressure of fluid in said straight air pipe operative upon supply of fluid under pressure thereto to open said second chamber to said brake pipe and upon release of fluid under pressure from said straight air pipe to open second chamber to atmosphere, and a manually operable valve in the connection between said brake pipe and valve means selectively operative to either open a communication therebetween or to close such communication and open to atmosphere the connection therefrom to said valve means.

5. In a locomotive brake equipment, in combination, fluid pressure operable brake applying means, a brake pipe, brake controlling means operative upon a reduction in pressure in said brake pipe to supply fluid under pressure to said brake applying means, a straight air pipe for conveying fluid under pressure to said brake applying means, an application and release pipe for conveying fluid under pressure to said brake applying means, double check valve means operable by fluid under pressure supplied by said brake controlling means to close communication between said brake applying means and said straight air pipe and said application and release pipe, release valve means controlling a vent from said brake applying means operable by fluid under pressure in a chamber to close said vent and upon release of fluid under pressure from said chamber to open said vent, an independent release pipe, a selector device operative upon release of fluid under pressure from said release pipe to effect operation of said release valve means to close said vent and open communication from said straight air pipe to said double check valve means and operative upon supply of fluid under pressure to said release pipe to effect operation of said release valve means to open said vent and to close such communication, an engineer's independent brake valve device for supplying fluid under pressure to said application and release pipe and for also venting said application and release pipe and at the same time either supplying fluid under pressure to or venting said independent release pipe, a fluid pressure supply pipe, and valve means controlling communication between said brake valve device and said independent release pipe operative by fluid under pressure to close such communication and open said release pipe to said fluid pressure supply pipe and upon release of such fluid under pressure to disconnect said release pipe from said fluid pressure supply pipe and open it to said brake valve device, and other valve means operative by fluid under pressure in said straight air pipe to subject said first valve means to pressure of fluid in said brake pipe.

GEORGE L. COTTER.

References Cited in the file of this patent
UNITED STATES PATENTS

| Number | Name | Date |
|---|---|---|
| 1,108,948 | Turner | Sept. 1, 1914 |
| 2,152,257 | Hewitt | Mar. 28, 1936 |
| 2,464,977 | Gorman | Mar. 22, 1949 |
| 2,512,046 | Watson | June 20, 1950 |